UNITED STATES PATENT OFFICE.

PAUL ROSENBERG, OF BERLIN, GERMANY.

PROCESS OF PRODUCING FORMALDEHYDE PREPARATIONS.

No. 849,815.          Specification of Letters Patent.          Patented April 9, 1907.

Application filed June 23, 1906. Serial No. 323,178. (Specimens.)

*To all whom it may concern:*

Be it known that I, PAUL ROSENBERG, a subject of the German Emperor, and a resident of Berlin, Kingdom of Prussia, German Empire, have invented new and useful Improvements in Processes of Producing Formaldehyde Preparations for Internal Medical Use, of which the following is a specification.

For using formaldehyde preparations for therapeutical purposes for internal complaints two points have to be considered. On the one hand, the formaldehyde should be chemically bound in such preparations so far that its disagreeable qualities, above all its sharp odor, is avoided. On the other hand, it is necessary that the formaldehyde will easily and completely split off in the human body.

Among the known combinations of formaldehyde and albumin, hydrocarbons, and the like we find none which will easily and reliably split off the formaldehyde in the body and represent chemically-uniform substances. It has been found that formaldehyde with lactose will give combinations which produce durable solid preparations adapted to be administered to patients in doses which when taken internally will easily and abundantly split off formaldehyde.

The reactions between lactose and formaldehyde will proceed in various manners under varying conditions. This may be explained by the large number of available alcoholic hydroxyl groups contained in the lactose. Among these groups, again, there are some which are equally well suited for the process of reaction, whereas others, owing to their relation to the aldehyde group and to the whole structure of the molecule, represent a class of their own.

By numerous experiments the laws of the reaction between lactose and formaldehyde were examined, and it was found that the combinations best suited for therapeutical purposes could be synthetized in known manner by an experimental arrangement. It was observed that the reaction proceeded considerably different at a temperature of 60°–70° centigrade if the concentration was effected in a vacuum than under ordinary circumstances. The table following farther down showing the experiments in which lactose was made to react with various quantities of formalin at a warm temperature shows that at ordinary pressure according to the quantity of formalin either a combination is formed in which four molecules of formaldehyde are bound with one molecule of lactose or at greater quantity of formalin, eight to nine molecules of formaldehyde are bound with one molecule of lactose. These regularities are, so to say, analogous with the regularities which were observed in the formation of the saccharates and the alkylation of various sugars. If the reaction of lactose-formaldehyde solution is effected with the above proportions under rapid concentration in vacuum, until a concentration of 32°–33° Baumé is obtained and the product then dried under ordinary pressure, a new combination is obtained with certainty, which combines five molecules of formaldehyde bound to one molecule of lactose. The new compound forms a crystalline white solid substance. This combination is suited in the best manner possible for internal therapeutical purposes and for the use of solid formaldehyde for disinfecting the mouth as a substitute for gargling-water. The combination has no odor and will split off uniformly formaldehyde inside the mouth.

At ordinary temperature combinations were obtained with the following contents of formaldehyde: Three grams of lactose well dried, treated with varying quantities of formalin and dried at ordinary pressure at about 65° centigrade. In order to enable a uniform drying, glass beads were mixed into the product. After drying the contents of formaldehyde was ascertained by titration by the sulfid method. Both method and solution were repeatedly tested.

The following results were obtained:

3 gm. lactose + 3 ccm. formalin =
     0.894 gm. $CH_2O$ = 22.9 % $CH_2O$ 3 gm. lactose + 5 ccm. formalin =
     1.02 gm. $CH_2O$ = 25.3 % $CH_2O$ 3 gm. lactose + 7 ccm. formalin =
     1.854 gm. $CH_2O$ = 38.2 % $CH_2O$ 3 gm. lactose + 8 ccm. formalin =
     1.946 gm. $CH_2O$ = 39.9 % $CH_2O$ 3 gm. lactose + 10 ccm. formalin =
     2.385 gm. $CH_2O$ = 44.28 % $CH_2O$ 3 gm. lactose + 6 ccm. formalin =
     1.05 gm. $CH_2O$ = 25.9 % $CH_2O$ 3 gm. lactose + 15 ccm. formalin =
     2.526 gm. $CH_2O$ = 45.7 % $CH_2O$ 3 gm. lactose + 5 ccm. formalin =
     1.056 gm. $CH_2O$ = 25.6 % $CH_2O$ Result: Up to 6 ccm. formalin to 3 gm. lactose equals 25–26 per cent., from 7 ccm.

formalin to 3 gm. lactose equals 38.2–44 per cent. in product.

The product is obtained by evaporating one and one-half parts of a forty-per-cent. aqueous solution of formaldehyde with one part of pure lactose in a vacuum at a temperature of 60°–70° centigrade to 32°–33° Baumé and drying under ordinary pressure at the same temperature of 60°–70° centigrade until a constant weight is obtained. By analysis it is found that by this procedure always a combination of five molecules of formaldehyde with one molecule of lactose is obtained. The product is also obtained if a quantity of formaldehyde larger than abovesaid in proportion to the lactose is employed. If, on the contrary, the experimental arrangement is made so that less formaldehyde is employed than mentioned in proportion to the quantity of lactose, products of variable composition with low contents of formaldehyde are obtained. The same is the case if the procedure is carried out in an open dish, the proportions of lactose and formaldehyde being the correct ones. Instead of the aqueous solution of the formaldehyde also its product of polymerization, trioxymethylene, can be used.

The new preparation when dry is a solid white crystalline substance and has no odor of formaldehyde. Contrary to lactose it is easily soluble in alcohol. By heating the alcoholic solution to from 60°–70° centigrade it is decomposed, so that formaldehyde is split off, and the lactose then becoming free will precipitate in form of a white crystalline substance in the alcoholic solution. Hereby, and also in accordance with the analytical values, it is evident that actually a uniform, heretofore not described, easily-decomposing combination is produced. This combination is easily soluble in alcohol, as also in acetone and in water.

Example: Fifteen kilograms of forty-per-cent. aqueous solution of formaldehyde are well mixed with ten kilograms of pure lactose and heated in a vacuum of about fifty to one hundred millimeters pressure, advantageously at a temperature of 65° centigrade, when solution will take place. Evaporation is carried on in the vacuum until the contents are of 32°–33° Baumé. The remaining syrupy viscid liquid, which contains besides water a surplus of formaldehyde, is thereupon completely dried at 65°–70° centigrade under ordinary pressure in a suitable drying apparatus.

Theoretically calculated, $$C_{12}H_{22}O_{11} + H_2O + CH_2O$$

will give C = 40.00%; H = 6.67%; formaldehyde = 29.41%. Actually found by analysis were: C = 40.15; 39.69; 40.56%; average, 40.13%; H = 6.94; 6.96; 7.02%; average, 6.97%; formaldehyde = 30.44; 30.20; 30.07%.

Having now described my invention, what I claim, and desire to secure by Letters Patent of the United States, is—

1. The process of producing a novel formaldehyde-lactose preparation for internal therapeutical use which contains one molecular proportion of lactose to five molecular proportions of formaldehyde consisting in evaporating the formaldehyde solution and lactose in a vacuum.

2. The process of producing a novel formaldehyde-lactose preparation for internal therapeutical use which contains one molecular proportion of lactose to five molecular proportions of formaldehyde consisting in evaporating the aqueous formaldehyde solution and lactose in a vacuum at a temperature of from 60° to 70° centigrade.

3. The process of producing a novel formaldehyde-lactose preparation for internal therapeutical use which contains one molecular proportion of lactose to five molecular proportions of formaldehyde consisting in evaporating the aqueous formaldehyde solution containing more than five molecular proportions of formaldehyde and one molecular proportion of lactose in a vacuum at a temperature of from 60° to 70° centigrade and drying the resulting product at the same temperature under ordinary pressure.

4. As a novel composition of matter a formaldehyde-lactose preparation for internal therapeutical use composed of one molecular proportion of lactose to five molecular proportions of formaldehyde, existing in form of a white crystalline substance devoid of the sharp odor of the formaldehyde and adapted to easily split into its two component parts when it is administered.

In testimony whereof I affix my signature in presence of two witnesses.

PAUL ROSENBERG.

Witnesses:
   HENRY HASPER,
   WOLDEMAR HAUPT.